United States Patent [19]

Gimpelson

[11] Patent Number: 5,164,339

[45] Date of Patent: Nov. 17, 1992

[54] FABRICATION OF OXYNITRIDE FRONTSIDE MICROSTRUCTURES

[75] Inventor: George E. Gimpelson, Newport News, Va.

[73] Assignee: Siemens-Bendix Automotive Electronics L.P., Auburn Hills, Mich.

[21] Appl. No.: 707,931

[22] Filed: May 28, 1991

Related U.S. Application Data

[63] Continuation of Ser. No. 252,801, Sep. 30, 1988, abandoned.

[51] Int. Cl.$^5$ .......................................... H01L 21/30
[52] U.S. Cl. ........................... 437/235; 437/228; 437/921; 437/901; 437/966; 148/DIG. 159
[58] Field of Search ............... 437/226, 228, 194, 238, 437/921, 235, 944, 901, 966; 73/715, 719, 720, 721, 725, 726, 727, 754, 304 C; 357/26; 148/DIG. 159, 33.2

[56] References Cited

U.S. PATENT DOCUMENTS

| | | | |
|---|---|---|---|
| 3,406,572 | 10/1968 | Robillard | 73/754 |
| 4,035,526 | 7/1977 | Konantz et al. | 437/194 |
| 4,097,889 | 6/1978 | Kern et al. | 437/194 |
| 4,416,952 | 11/1983 | Nishizawa et al. | 437/33.3 |
| 4,510,436 | 4/1985 | Raymond | 73/304 C |
| 4,522,067 | 6/1985 | Burger et al. | 73/726 |
| 4,523,372 | 6/1985 | Balda et al. | 437/194 |
| 4,605,470 | 8/1986 | Gwozdz et al. | 437/194 |
| 4,656,729 | 4/1987 | Kroll, Jr. et al. | 437/170 |
| 4,665,610 | 5/1987 | Barth | 148/DIG. 159 |
| 4,670,092 | 6/1987 | Motamedi | 437/65 |
| 4,670,967 | 6/1987 | Hazuki | 437/194 |
| 4,786,962 | 11/1988 | Koch | 437/194 |
| 4,826,785 | 5/1989 | McClure et al. | 437/228 |
| 4,837,185 | 6/1989 | Yau et al. | 437/235 |
| 4,854,263 | 8/1989 | Chang et al. | 118/715 |
| 4,871,687 | 10/1989 | Donzelli | 437/944 |
| 4,872,947 | 10/1989 | Wang et al. | 118/50.1 |
| 4,906,592 | 3/1990 | Merenda et al. | 437/194 |
| 4,907,064 | 3/1990 | Yamazaki et al. | 357/54 |
| 4,911,513 | 3/1990 | Valette | 350/96.14 |
| 5,059,556 | 10/1991 | Wilcoxen | 437/921 |
| 5,062,302 | 11/1991 | Petersen et al. | 73/754 |

FOREIGN PATENT DOCUMENTS

| | | | |
|---|---|---|---|
| 3234907 | 3/1984 | Fed. Rep. of Germany | 437/194 |
| 0106146 | 7/1982 | Japan | 437/194 |
| 0162448 | 10/1982 | Japan | 437/194 |
| 0168240 | 10/1983 | Japan | 437/194 |
| 0197855 | 11/1983 | Japan | 437/194 |
| 0025245 | 2/1984 | Japan | 437/194 |
| 0085532 | 5/1985 | Japan | 437/194 |
| 0020352 | 1/1986 | Japan | 437/194 |
| 0027659 | 2/1986 | Japan | 437/194 |
| 0135141 | 6/1986 | Japan | 437/194 |
| 0137343 | 6/1986 | Japan | 437/194 |
| 0140149 | 6/1986 | Japan | 437/194 |
| 0203654 | 9/1986 | Japan | 437/194 |
| 0206242 | 9/1986 | Japan | 437/194 |
| 0228655 | 10/1986 | Japan | 437/194 |

OTHER PUBLICATIONS

Wolf et al., *Silicon Processing for the VLSI Era, vol. 1-Process Technology*, Lattice Press, 1986, pp. 535-536.
Lee et al, "Silicon Micromachining Technology . . . " SAE Technical Papers, pp. 1-10.
Allan, Roger, "Sensors in Silicon", High Technology/-Sep. 1984, pp. 43-77.

*Primary Examiner*—Mary Wilczewski
*Attorney, Agent, or Firm*—George L. Boller; Russel C. Wells

[57] ABSTRACT

Method for producing a low stress silicon oxynitride microstructure on a semiconductor substrate at temperatures not higher than 500° C. The method is particularly adapted for forming integrated silicon sensors where the oxynitride microstructure is fabricated on a substrate under conditions which do not harm the integrated circuit electronics.

19 Claims, 2 Drawing Sheets

FABRICATION OF OXYNITRIDE FRONTSIDE MICROSTRUCTURES

This is a continuation of application Ser. No. 07/252,801, filed Sep. 30, 1988, now abandoned.

FIELD OF THE INVENTION

The present invention relates to oxynitride frontside microstructures, and to their fabrication.

BACKGROUND OF THE INVENTION

The application of silicon-based electronics systems, especially for automotive applications, has seen an almost explosive growth in the last few years. The silicon-based electronics are used to store control algorithms, process information, and to direct actuators to perform various functions, including steering, suspension, and display of driver information, to name but a few. While the electronics revolution unfolds, sensor technology, on the other hand, is not keeping pace, and sensor designs continue to be based on dated technologies with inbred limitations. Recent trends have identified silicon as the basis for future sensor technology, and this hopefully will close this technology gap and permit greater application of control systems utilizing sensor technology.

Existing control systems use silicon-based electronics, and nearly all have embedded microprocessors. Silicon is widely recognized in the industry as being suitable for this application in view of its high reliability, high strength and low cost. In addition, silicon sensor designs can be created using a variety of manufacturing processes, one of the most promising of which is referred to as "micromachining" which uses chemical processes to introduce three-dimensional mechanical structures into silicon. These "microstructures", as they are referred to, can be made sensitive to specific physical phenomena, such as acceleration, pressure or fluid flow, by taking advantage of several special properties of silicon, including piezo resistance, piezo electric and controlled resistance. For example, a micromachined cantilevered beam produces a minute resistance change when flexed by the force of acceleration. However, the output signal from this micromachined sensor is very small (millivolts), so that additional electronic circuitry is necessary for signal conditioning and amplification. These electronic circuits are usually integrated circuit chips which are interconnected to the micromachined element. Different aspects of micromachining are reviewed in Lee et al, "Silicon Micromachining Technology For Automotive Applications", SAE Publication No. SP 655, February 1986, and the entire content of that publication is hereby incorporated by reference.

A disadvantage associated with polycrystalline silicon is that it possesses an inherent high compressive stress. For example, undoped polycrystalline silicon has a stress of the order of $-5 \times 10^9$ dyne/cm$^2$. This high compressive stress is a disadvantage especially when polysilicon is used for the fabrication of free-standing microstructures, such as cantilevers or bridges, which must be mechanically stable and must not buckle or break. Such structures must have a low level of stress in order to produce free-standing stable structures of sufficient dimension to be useful as a sensing element. In a typical polysilicon deposition process used widely in the fabrication of integrated circuits today, silane gas is injected into a process tube at low pressure and a temperature of approximately 625° C. These processing conditions produce a very uniform layer of deposited polysilicon material on a substrate. However, the polysilicon layer and the underlying substrate will produce a net compressive stress force in the polysilicon and this gives rise to the disadvantages noted earlier.

Recently, there has been much research into methods for producing stress-free polycrystalline silicon. These methods have primarily been to deposit the silicon at a temperature that will produce an amorphous silicon film having little or no crystalline structure present. There have been other attempts to anneal the polysilicon in different ways to relieve the stress. All of the prior methods suffer from the disadvantage of changing the polysilicon deposition parameters and utilizing high temperatures (i.e. above 600° C.) and are incompatible with current technology trends and processing methods. In particular, the use of high temperatures for annealing and other processing is precluded if pre-existing electronic circuitry is present.

SUMMARY OF THE INVENTION

It has now been found that it is possible to fabricate devices such as microsensors at relatively low temperatures by creating an oxynitride microstructure on a suitable semiconductor substrate. Thus, according to one aspect of the present invention; there is provided a method of producing a microstructure comprising forming an oxynitride microstructure on the surface of a silicon substrate. According to another aspect of the present invention, there is provided a method of forming an integrated silicon sensor comprising forming an oxynitride microstructure on a major surface of a substrate having at least one integrated circuit provided on that major surface, under conditions which do not adversely affect the integrated circuit. According to a yet further aspect of the present invention, there is provided a device comprising a semiconductor substrate and an oxynitride microstructure disposed on a major surface of the substrate.

It will be appreciated that by fabricating the oxynitride microstructure at relatively low temperatures, typically not higher than 500° C., and preferably within the range of about 80° to 450° C., it is possible to fabricate sensors and other components on a prefabricated integrated circuit without destroying or otherwise harming the electronics. The method of the present invention thus facilitates exploitation of the so-called "foundry" concept in which integrated circuit processing is first carried out on a silicon wafer and this is followed, at a later stage, by fabrication of integrated sensor microstructures on vacant real estate of the wafer. By fabricating the sensor microstructures at temperatures less than 500° C., and preferably less than 400° C., it is possible to introduce a large number of sensors having different architecture without damaging the electronic circuitry already present on the wafer.

A further advantage realized according to the present invention is that the fabrication of the microstructures can be controlled so as to produce a low stress oxynitride. Typically, the stress of the oxynitride of the microstructures of the present invention is less than about $5 \times 10^8$ dynes/cm$^2$, and may be in the range of $5 \times 10^6$ to $5 \times 10^8$ dynes/cm$^2$, which enables the formation of stable and flexible oxynitride bridges and cantilevers. The material ordinarily used for fabrication of microstructures is polysilicon but, as indicated earlier, polysilicon suffers from an inherent compressive stress, and requires deposition temperatures in excess of 550° C., usually in the region of 625° to 650° C. This inherent compressive stress associated with polysilicon makes that material somewhat unsuitable for the fabrication of sensors which rely on a bridge or cantilever-type configuration. The stress of the oxynitride microstructure can be carefully controlled by adjusting the ingredients used to form the oxynitride, typically silane, nitrous oxide and nitrogen.

As a result of the stability and flexibility of the oxynitride microstructures of the present invention, it is possible to fabricate free-standing microstructures suitable for use as, for example, accelerometers, pressure sensors and mass air flow sensors, such as anemometers. Other sensing functions are also within the purview of the microstructures of the present invention, such as, for example, in the automobile industry for detecting fuel flow rate, valve position and cylinder pressure.

BRIEF DESCRIPTION OF THE DRAWINGS

Preferred embodiments of the present invention will now be described with reference to the accompanying drawings, in which.

DETAILED DESCRIPTION OF THE INVENTION

It will be understood that, for purposes of simplicity and ease of description and understanding, the invention will now be described with respect to the formation of an oxynitride microstructure of an uncomplicated type. It will be appreciated, however, that in a typical arrangement, there may be one or more integrated circuit components and one or more microstructures formed on the same side of the silicon substrate. In addition, since oxynitride is an insulator, the sensor comprising oxynitride is adapted for measurement of the sensed phenomenon, such as fluid flow rate, pressure or acceleration, utilizing capacitive, piezo electric or piezo resistive techniques. This is discussed below in connection with FIGS. 7 and 8.

Referring to FIGS. 1 through 6, there is shown a silicon substrate 2, typically in the form of a wafer, on which there is formed a spacer layer 4. The spacer layer may be a metal layer such as an aluminum layer formed by sputtering aluminum at elevated temperatures, typically about 200° C., using conventional sputtering technology. Alternatively, the spacer layer 4 may be an oxide layer, for example a layer of silicon dioxide formed by oxidizing the silicon substrate 2 at an elevated temperature, for example 950° to 1100° C., typically 1000° to 1050° C., for a period of about 3 to 6 hours, usually about 4 hours, in the presence of steam. The process in which the silicon dioxide layer is formed is conventional, and well known to a person of ordinary skill in this art. The resulting spacer layer 4 is generally about 1 to 2 microns thick.

Figure 1:
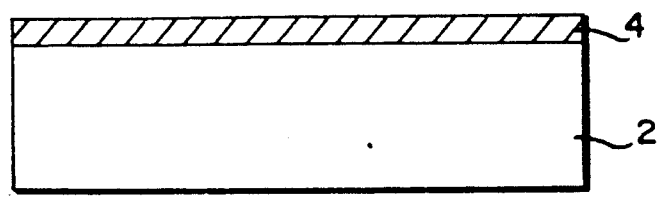
FIGS. 1 through 6 show schematically the principal method steps of the present invention.
Figure 2:
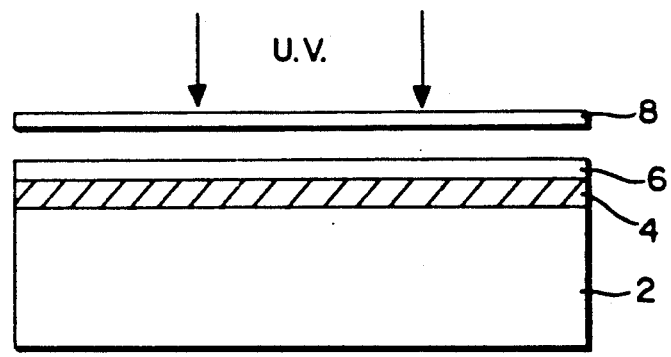

The spacer layer 4 is then etched using conventional photolithography techniques to produce an etched spacer layer. In this step, the spacer layer is coated with an emulsion 6 of a standard photoresist material, and subjected to ultraviolet light through a mask 8 to define a desired pattern in the photoresist material, as shown in FIG. 2.

Figure 3:
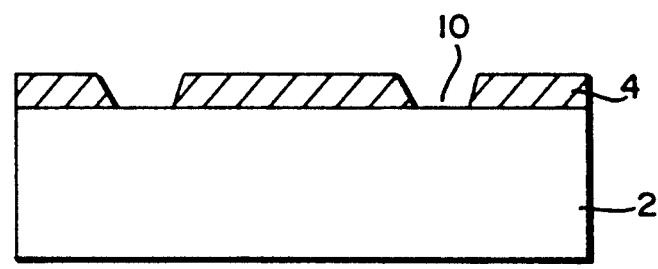

The exposed photoresist material is then developed and etched using conventional techniques to produce an etched spacer layer as shown in FIG. 3. It can be clearly seen in FIG. 3 that the etched layer 4 has windows 10 extending through to the silicon substrate 2.

Figure 4:
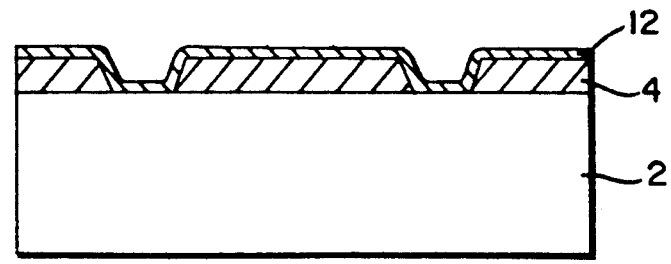

An oxynitride layer 12 is then deposited on the etched spacer layer 4 to produce the structure shown in FIG. 4. The oxynitride is deposited utilizing plasma-enhanced chemical vapor deposition (PECVD) to produce an oxynitride layer having a thickness of, for example, between 1000 and 25000 Angstroms, such as 7000 to 8000 Angstroms. The oxynitride layer is formed from a mixture of silane (silicon tetrahydride), nitrous oxide and nitrogen. The relative proportions of silane, nitrous oxide and nitrogen are carefully chosen so as to ensure that the resulting oxynitride layer is of low stress, i.e. less than $5 \times 10^8 dyne/cm^2$. It has been found that this can be achieved by adjusting the relative amounts of silane, nitrous oxide and nitrogen so that the volume ratio between those constituents is 0.5 to 2 (silane):3 to 12 (nitrous oxide):5 to 20 (nitrogen), preferably about 1 (silane):6 (nitrous oxide):10 (nitrogen).

The stress of the microstructures of the present invention is measured by techniques known to persons of ordinary skill in this art. In particular, the method described by Guckel et al, "A Simple Technique for the Determination of Mechanical Strain in Thin Films with Application to Polysilicon", J. App. Phys., 1671, 1985 may be used to measure the strain in the silicidated microstrucure. The stress is then calculated from a knowledge of known mathematical techniques. An alternative method for measuring the stress is to use a stress guage, such as the one manufactured by Ionic Systems Inc. under the model number 30122. Such a guage measures the average stress across the wafer.

The deposition of the oxynitride layer is carried out at a temperature of not more than 500° C., and is preferably in the region of 150° to 300° C. The deposition is effected under reduced pressure, typically in the region of about 200 to 400 microtorr (mtorr), preferably about 300 mtorr. Ordinarily, the deposition is carried for a period of about 20 to 40 minutes, depending on the desired thickness of oxynitride layer, and at a power level of about 40 to 60 watts.

It has been found, according to a preferred embodiment, that an oxynitride layer having a thickness of about 7200 Angstroms can be obtained by depositing oxynitride under conditions of plasma-enhanced chemical vapor deposition using silane, nitrous oxide and nitrogen in a volume ratio of about 1:6:10 at a pressure of about 300 mtorr, a temperature of about 300° C., over a time period of about 20 minutes at a power level of 45 watts.

Figure 5:
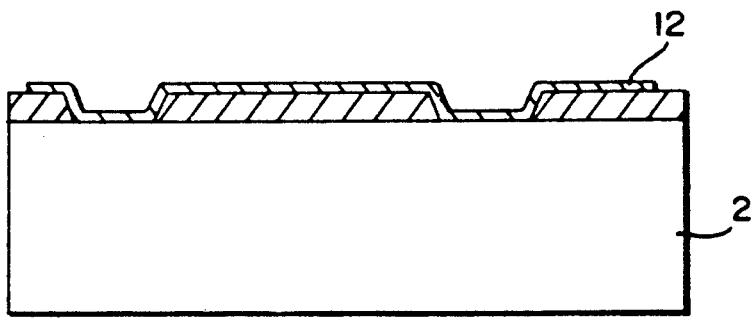

Following deposition, the oxynitride layer 12 is then subjected to etching using conventional photoresist techniques. This produces an etched oxynitride layer 12 as shown in FIG. 5.

Figure 6:
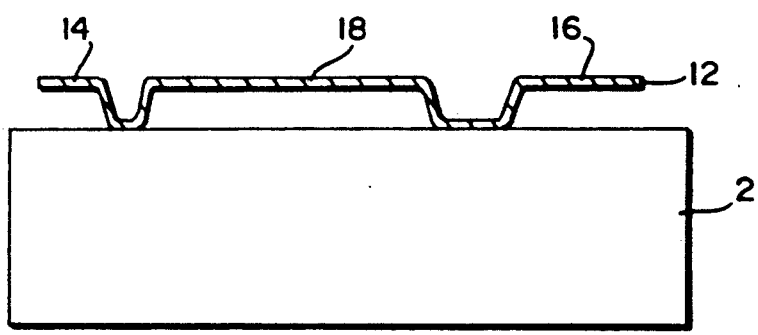

FIG. 6 shows the result of etching the spacer layer (or sacrificial layer) 4 to give a low stress free-standing microstructure 14. As will be seen from FIG. 6, the microstructure 14 can possess cantilever portions 16 or bridge portions 18 which are stable and do not buckle or break in view of the absence of tensile or compressive stress in the oxynitride material. As noted earlier, the stress of the oxynitride layer is less than $5 \times 10^8$ dyne/cm$^2$, and preferably less than $1 \times 10^8$ dyne/cm$^2$.

Figure 7:
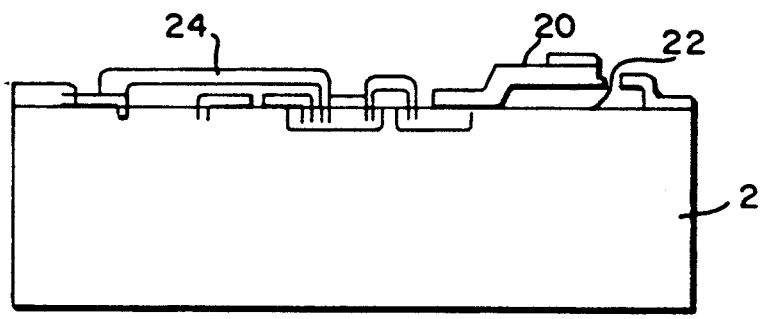
FIG. 7 shows a side view of an integrated silicon sensor comprising an integrated circuit and a cantilever oxynitride microstructure.

A particularly preferred aspect of the present invention is illustrated in FIG. 7. In that Figure, there is shown an oxynitride microstructure 20 formed on the frontside 22 of the silicon substrate 2 in close proximity to the integrated circuit 24. The fabrication of such frontside microstructures is made possible by the fact that the present invention is carried out at temperatures not higher than 500° C., and preferably less than 400° C. so that adjacent integrated circuit electronics are not subjected to heat damage. A further important advantage associated with this approach is that all of the processing and manipulation of the wafer is effected on one side of the silicon substrate (i.e. the frontside), thereby obviating the need to effect processing manipulation on both sides of the wafer, such as is required when using conventional back-etch techniques. The overall strength of the integrated sensor is thereby increased, and the overall cost of production is reduced.

Figure 8:
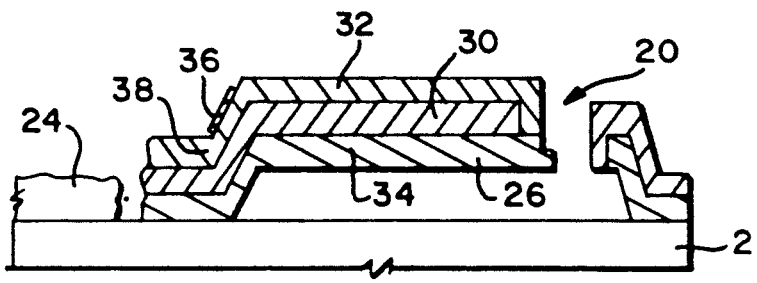
FIG. 8 shows an enlarged cross-sectional view of embodiments of the cantilever of FIG. 7.

FIG. 8 shows a cantilever of the invention adapted for measuring acceleration as reflected by flexing of the cantilever terminal portion 26. In the embodiment shown in FIG. 8, the cantilever 20 has a metal layer 30 sandwiched between two layers of oxynitride 32, 34. Such a structure may be fabricated using conventional deposition techniques, e.g. sputtering or evaporation, discussed earlier. The metal may be selected from aluminum, platinum, nickel, titanium, tungsten, gold, chromium, silver, palladium, titanium-tungsten, titanium-platinum, aluminum-silicon, aluminum-silicon-copper. The preferred metal layer is aluminum. The layer can be present as a thin layer, for example not more than 1000 Angstroms thick. While the preferred structure shown in FIG. 8 contains three layers, it is possible to use two layers or more than three layers. Whichever arrangement is employed, it is important to encapsulate the metal layer (as shown in FIG. 8), especially when the layer is aluminum, to minimise corrosion and wear.

In the FIG. 8 embodiment, the capacitive change is being measured as a result of flexing of the cantilever 20 with respect to the substrate 2. Alternatively, however, it is possible to measure the movement of the cantilever by use of a piezoelectric or piezoresistive element such as that shown at 36. The element is disposed on a highly stressed part of the cantilever structure 20 and detects movement of the free end of the cantilever. Any suitable piezoelectric material, for example zinc oxide, or piezoresistive material, for example silicon, may be used.

The invention will now be further described with reference to the following Example.

EXAMPLE

Three silicon wafers having an aluminum film formed on the surface thereof were prepared using conventional electron (E)-beam techniques at 200° C. The thickness of the aluminum film in each instance was about 2 microns. An emulsion of standard photoresist material was then applied to the aluminum film of each of the three wafers, and each were exposed to ultraviolet light through a standard contact mask. Each wafer was then developed and subjected to etching using standard procedures to etch the aluminum film down to the silicon in accordance with the pattern of the mask.

The three wafers thus formed were then treated as follows:

Sample 1

A nitride film was deposited on the wafer using plasma-enhanced chemical vapor deposition under the following conditions:
$SiH_4$—19% (11 sccm)
$NH_3$—10% (7.2 sccm)
$N_2$—18% (189 sccm)
The PECVD was carried out at 300° C. for 35 minutes at a power level of 57 watts and a pressure of 400 mtorr. This resulted in a nitride layer having a thickness of about 8000 Angstroms.

Sample 2

A nitride layer was deposited on the wafer using PECVD under the following conditions:
$SiH_4$—17% (8.5 sccm)
$NH_3$—55% (41.25 sccm)
$N_2$—10% (100 sccm)
The PECVD was carried out at 350° C. for 34 minutes at a power level of 57 watts and a pressure of 350 mtorr. This resulted in a nitride layer having a thickness of about 7300 Angstroms.

Sample 3

An oxynitride layer was deposited on the wafer under the following conditions:
$SiH_4$—20% (10 sccm)
$N_2O$—80% (60.0 sccm)
$N_2$—10% (100 sccm)
The PECVD was carried out at a temperature of 300° C. for 23 minutes at a power level of 45 watts and a pressure of 300 mtorr. This resulted in a oxynitride layer having a thickness of about 7200 Angstroms.

Each wafer was then subjected to photolithography using conventional techniques followed by reactive ion etching (RIE) with a nitride etch, using a power level of 60 watts (20%) under a pressure of 90 mtorr with a $CF_4/O_2$ mixture introduced at a flow rate of 16 sccm (40%). The etch time was about 10 to 20 minutes.

Finally, a sacrificial layer etch was carried out using potassium hydroxide or "pirahana" (a hydrogen peroxide/sulphuric acid mixture) to remove remaining aluminum and produce a free-standing microstructure.

Samples 1 and 2 (with the nitride layers) collapsed due to high stress present in the nitride layer. Sample 3, on the other hand, resulted in a stable, low stress oxynitride free-standing structure which did not collapse or buckle, as evidenced by scanning electron microscope (SEM) photography.

I claim:

1. A method for producing a low stress free-standing microstructure, said method comprising the steps of:
   providing a silicon substrate;
   forming a spacer layer on said silicon substrate;
   etching a pattern in said spacer layer to produce an etched spacer layer;
   forming a silicon oxynitride layer on said etched spacer layer; and
   etching said spacer layer to remove said spacer layer without removing portions of said oxynitride layer formed on said spacer layer to form said low stress free-standing oxynitride microstructure on said substrate.

2. A method according to claim 1, wherein said step of forming said oxynitride layer is carried out at a temperature of not more than 500° C.

3. A method according to claim 2, wherein said temperature is in the range of 150° C. to 300° C.

4. A method according to claim 1, wherein said microstructure is in the form of a bridge.

5. A method according to claim 1, wherein said microstructure is in the form of a cantilever.

6. A method according to claim 1, wherein said microstructure has a stress of less than $5 \times 10^8$ dyne/cm$^2$.

7. A method according to claim 6, wherein said stress is in the region of $5 \times 10^6$ to $1 \times 10^8$ dyne/cm$^2$.

8. A method according to claim 1, wherein said spacer layer is formed of aluminum.

9. A method according to claim 1, wherein said oxynitride layer is formed by a plasma-enhanced chemical vapor deposition of oxynitride from a mixture comprising silane, nitrous oxide and nitrogen.

10. A method according to claim 9, wherein said silane, nitrous oxide and nitrogen are present in a volume ratio of 0.5 to 2 (silane):3 to 12 (nitrous oxide):5 to 20 (nitrogen).

11. A method according to claim 10, wherein said volume ratio of silane to nitrous oxide to nitrogen is about 1:6:10.

12. A method according to claim 9, wherein said chemical vapor deposition is carried out at a temperature of about 300° C. for a time period of about 25 minutes and at a power level of about 45 watts and a pressure of about 300 mtorr.

13. A method according to claim 9, wherein said oxynitride layer has a thickness of about 1000 to about 25000 Angstroms.

14. A method for forming an integrated silicon sensor comprising a low stress free-standing oxynitride microstructure, said method comprising the steps of:
providing a substrate having at least one integrated circuit on the major surface thereof;
forming a spacer layer on said substrate;
etching a pattern in said spacer layer to produce an etched spacer layer;
forming a silicon oxynitride layer on said major surface under conditions which do not adversely affect said integrated circuit; and
etching said spacer layer to remove said spacer layer without removing portions of said oxynitride layer formed on said spacer layer to form said low stress free-standing oxynitride microstructure on said substrate.

15. A method according to claim 14, wherein said step of forming said oxynitride layer is carried out at a temperature not higher than 500° C.

16. A method according to claim 15, wherein said temperature is in the region of 150° to 300° C.

17. A method according to claim 14, wherein said oxynitride microstructure comprises a metal layer disposed between two oxynitride layers.

18. A method according to claim 17, wherein said metal is selected from the group consisting of aluminum, platinum, nickel, titanium, tungsten, gold, chromium, silver, palladium, titanium-tungsten, titanium-platinum, aluminum-silicon, and aluminum-silicon-copper.

19. A method according to claim 18, wherein said metal is aluminum and is encapsulated between said layers of oxynitride.

* * * * *